United States Patent
Janson

(10) Patent No.: US 10,913,350 B2
(45) Date of Patent: Feb. 9, 2021

(54) RANGED POWER TAKE-OFF UNIT FOR TRANSAXLE

(71) Applicant: Ford Global Technologies, LLC, Dearborn, MI (US)

(72) Inventor: David Allen Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 224 days.

(21) Appl. No.: 16/120,772

(22) Filed: Sep. 4, 2018

(65) Prior Publication Data

US 2020/0070653 A1  Mar. 5, 2020

(51) Int. Cl.
| | |
|---|---|
| *B60K 17/34* | (2006.01) |
| *B60K 17/344* | (2006.01) |
| *B60K 17/08* | (2006.01) |
| *B60K 23/08* | (2006.01) |
| *F16H 3/54* | (2006.01) |
| *F16H 37/08* | (2006.01) |
| *F16H 7/06* | (2006.01) |

(52) U.S. Cl.
CPC ............ *B60K 17/344* (2013.01); *B60K 17/08* (2013.01); *B60K 23/0808* (2013.01); *F16H 3/54* (2013.01); *F16H 37/082* (2013.01); *F16H 7/06* (2013.01); *F16H 2200/0017* (2013.01); *F16H 2200/0034* (2013.01); *F16H 2200/2005* (2013.01); *F16H 2200/2064* (2013.01); *F16H 2200/2094* (2013.01); *F16H 2200/2097* (2013.01)

(58) Field of Classification Search
CPC .......................... B60K 17/3467; B60K 17/342
See application file for complete search history.

(56) References Cited

U.S. PATENT DOCUMENTS

| | | | |
|---|---|---|---|
| 5,041,068 A | * | 8/1991 | Kobayashi ......... B60K 17/3462 180/248 |
| 8,381,861 B2 | | 2/2013 | Zink |
| 8,449,430 B2 | | 5/2013 | Burke et al. |
| 8,544,588 B2 | | 10/2013 | Janson |
| 8,961,350 B1 | | 2/2015 | Mellet et al. |
| 9,272,619 B2 | | 3/2016 | Quehenberger et al. |
| 9,731,598 B2 | | 8/2017 | Reed et al. |
| 2011/0195812 A1 | | 8/2011 | Burke et al. |

* cited by examiner

*Primary Examiner* — Derek D Knight
(74) *Attorney, Agent, or Firm* — Vincent Mastrogiacomo; Brooks Kushman P.C.

(57) ABSTRACT

A front wheel drive based four wheel drive powertrain includes range gearing, bevel gearing, final drive gearing, and a differential. The range gearing, final drive gearing, and differential are on the same axis. The bevel gearing, which transfers power to a rear drive unit, is upstream of the final drive gearing in the power flow. Consequently, no step-down ratio is required to provide a suitable driveshaft speed.

19 Claims, 5 Drawing Sheets

FIG. 1 – PRIOR ART

RANGED POWER TAKE-OFF UNIT FOR TRANSAXLE

TECHNICAL FIELD

This disclosure related to the field of automotive powertrains. More particularly, the disclosure relates to a transaxle and power take-off unit providing a low range mode.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

FIG. 1 depicts a typical front wheel drive transaxle. Power is provided by internal combustion engine 10. The crankshaft of engine 10 drives torque converter 12. Torque converter 12 permits the engine to idle while the vehicle is stationary. Torque converter 12 transmits the power to gearbox 14. In some operating conditions, torque converter 12 may decrease shaft speed and increase shaft torque. Gearbox 14 adjusts the speed and torque according to current vehicle requirements. Engine 10, torque converter 12, and gearbox 14 are situated on a common axis offset from the axis about which the front wheels 16 and 18 rotate. The transaxle includes axis transfer and final drive gearing 20 to transfer power from gearbox 14 to differential 22, which is located approximately on the wheel rotation axis. The same gearing may accomplish both axis transfer and final drive speed reduction. Alternatively, the axis transfer components may provide no or minimal speed reduction necessitating separate final drive gearing on the differential axis. Differential 22 transmits the power to left and right wheels 16 and 18 via half shafts 24 and 26 respectively while permitting slight speed differences when the vehicle turns a corner.

SUMMARY

An automotive power take-off unit includes range gearing, final drive gearing, and bevel gearing. The range gearing is configured to transmit power from a first gear element, such as a sprocket, to first and second shafts alternately at a direct drive ratio and an underdrive ratio. The final drive gearing is configured to transmit the power from the first shaft to a differential. The bevel gearing is configured to transfer power from the second shaft to a driveshaft. The first gear element, first and second shafts, and differential are co-axial. The bevel gearing may have a gear ratio between 0.8 and 1.2. The second shaft may be hollow shaft and the first shaft may extend through the second shaft. The differential may be configured to transmit the power to first and second half shafts wherein the first half shaft extends through the first shaft which is hollow. The range gearing may include a sun gear, a ring gear, a carrier, a plurality of planet gears, and a sleeve. The sun gear may be fixedly coupled to the first gear element. The ring gear may be fixedly held against rotation. The carrier may be fixedly coupled to an input of the differential. The plurality of planet gears may be supported for rotation with respect to the carrier and may mesh with the sun gear and the ring gear. The sleeve may be fixedly coupled to the first shaft and supported to slide between first, second, and third positions. The sleeve may engage the sun gear in the first and third positions and the carrier in the second position. The sleeve may also engage the second shaft in the first and second positions but not the third position.

A vehicle powertrain includes a first sprocket, range gearing, final drive gearing, and bevel gearing. The first sprocket is on (rotates about) a differential axis. The range gearing is configured to transmit power from the first sprocket to first and second shafts on the differential axis alternately at a direct drive ratio and an underdrive ratio. The final drive gearing is configured to transmit the power from the first shaft to a differential on the differential axis. The bevel gearing is configured to transfer power from the second shaft to a driveshaft. The bevel gearing may have a gear ratio between 0.8 and 1.2. The powertrain may also include a chain engaging the first sprocket and a second sprocket. The chain may impose a speed ratio between the first sprocket and the second sprocket between 0.8 and 1.2. The first and second shafts may be hollow with the first shaft extending through the second shaft. The differential may be configured to transmit the power to first and second half shafts wherein the first half shaft extends through the first shaft. The final drive gearing may include a sun gear, a ring gear, a carrier, and a plurality of planet gears. The sun gear may be fixedly coupled to the first shaft. The ring gear may be fixedly held against rotation. The carrier may be fixedly coupled to an input of the differential. The plurality of planet gears may be supported for rotation with respect to the carrier and may mesh with the sun gear and the ring gear.

A vehicle powertrain includes a chain, range gearing, final drive gearing, and bevel gearing. The chain engages a first sprocket and a second sprocket. The range gearing is configured to transmit power from the first sprocket to first and second shafts alternately at a direct drive ratio and a first underdrive ratio. The final drive gearing is configured to transmit the power from the first shaft to a differential at a second underdrive ratio. The bevel gearing is configured to transfer power from the second shaft to a driveshaft. The bevel gearing may have a gear ratio between 0.8 and 1.2. The chain may impose a speed ratio between the first sprocket and the second sprocket between 0.8 and 1.2.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A group of rotatable elements are fixedly coupled to one another if they are constrained to have the same rotational velocity about an axis of rotation in all operating conditions. Elements may be fixedly coupled by, for example, spline connections, welding, press fitting, or machining from a common solid. Slight variations in rotational displacement between fixedly coupled elements may occur such as displacement due to lash or shaft compliance. In contrast, two elements are selectively coupled by a shift element when the shift element constrains them to have the same rotational velocity about an axis of rotation whenever the shift element is fully engaged and the elements are free to have different rotational velocities about the axis in at least some other operating condition. A shift element that holds a rotatable element against rotation by selectively coupling it to the housing is called a brake. A shift element that selectively couples two or more rotatable elements to one another is called a clutch. Shift elements may be actively controlled devices such as hydraulically or electrically actuated clutches or brakes or may be passive devices such as one way clutches or brakes. Two elements are coupled if they are either fixedly coupled or selectively coupled.

Figure 1:
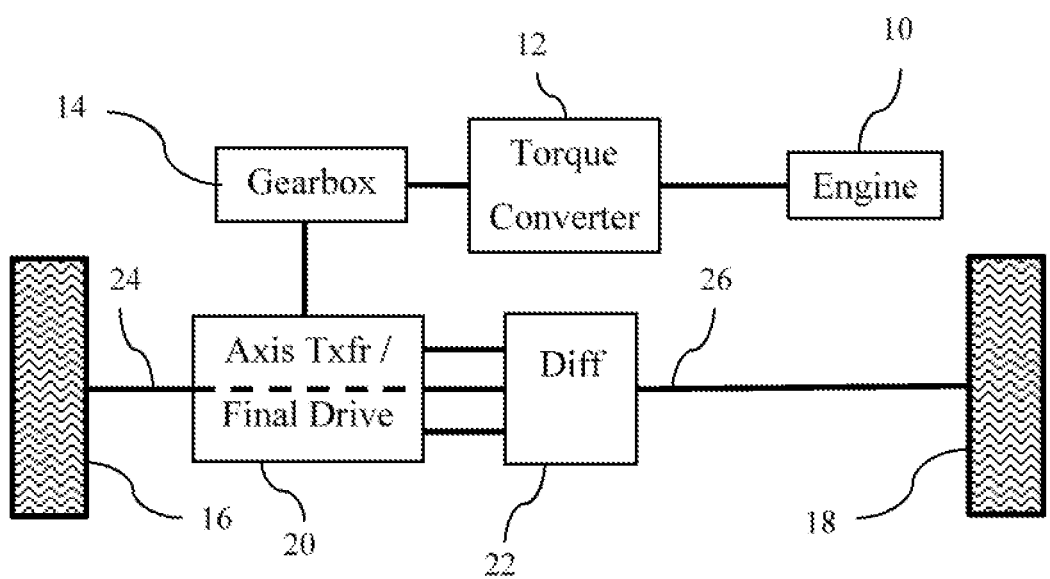
FIG. 1 is a schematic representation of a front wheel drive vehicle powertrain.

The powertrain of FIG. 1 directs power to only two of the vehicle wheels. When road conditions are slippery, it is beneficial to direct power to all four of the vehicle wheels, increasing the odds of at least one of the driven wheels having traction. Also, since the force at each wheel is less, the likelihood of a wheel losing traction is decreased. For off-road usage, such as climbing steep, rocky hills, it is also desirable to have a low range such that the driver has better control of vehicle speed. To maximize fuel economy on dry roads, it is beneficial if a vehicle can also operate in a two-wheel drive, high range mode.

It is preferable for the power to be diverted from the front axle to the rear axle downstream of the axis transfer but upstream of the final drive ratio. In a typical vehicle, there is no path for a driveshaft between the engine axis and the rear axle, so locating the power take-off on the engine axis is impractical. Typical rear axles include integrated final drive ratios. Therefore, if the power take-off is located downstream of the front wheel final drive ratio, it is necessary to include overdrive gearing such that the front wheel and rear wheel speeds are nearly equal. Also, it is preferable to locate the range gearing upstream of the power take-off. If the range gearing is located downstream of the power take-off, then separate range gearing is required for the front and rear axles.

Figure 2:
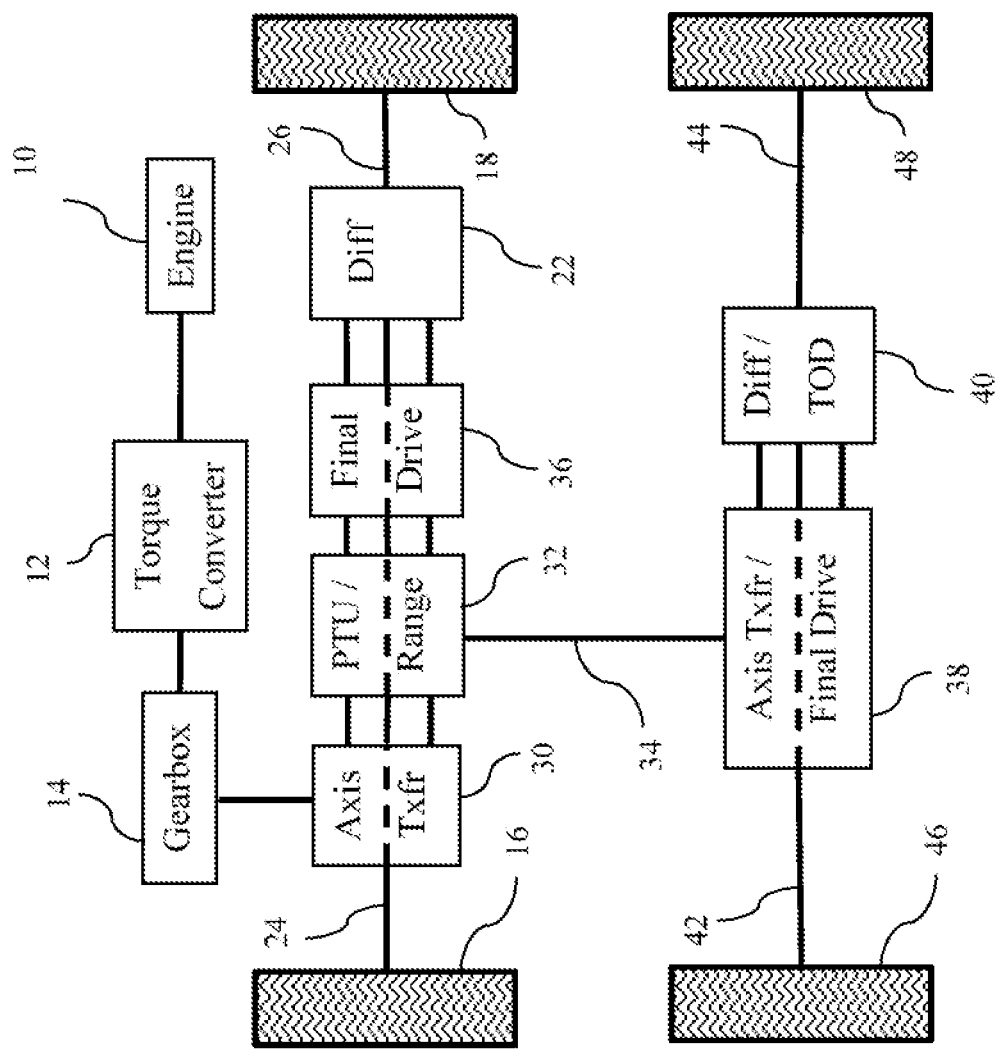
FIG. 2 is a schematic representation of a four wheel drive vehicle powertrain.

FIG. 2 schematically illustrates an all wheel drive powertrain. The engine 10, torque converter 12, and gearbox 14 function as described with respect to FIG. 1 above. Power is transferred from the engine axis to the front differential axis by axis transfer gearing 30 which provides little or no ratio change. The gear ratio of the axis transfer gearing is preferably between 0.8 and 1.2. Power take-off/Range gearing 32 provides two functions. First, it allows selection of either a direct drive ratio or an underdrive (low) ratio. Second, it selectively transfers power to driveshaft 34. The structure of Power take-off/range gearing 32 is described in more detail below. Front final drive gearing 36 provides a fixed speed reduction for the portion of the power directed to the front wheels. Finally, front differential 22 divides the front wheel power between half shaft 24 and half shaft 26, allowing slight speed differences so the vehicle can turn a corner without either wheel slipping. Note that half shaft 24 extends through axis transfer gearing 30, PTU/Range gearing 32 and final drive gearing 36 to reach the drive wheel 16.

The power is directed to the rear wheels by driveshaft 34. Axis transfer/final drive gearing 38 changes the axis of rotation by roughly 90 degrees to direct it onto the rear differential axis and also provides a fixed rear final drive ratio. The rear final drive gear ratio is close to, but not necessarily exactly the same as, the front final drive gear ratio. The two functions of axis transfer and gear reduction may be performed by the same gearing, such as hypoid gearing. Rear differential 40 divides the rear wheel power between half shaft 42 and half shaft 44 which, in turn, drive rear wheels 46 and 48 respectively. Differential 40 may include a Torque-On-Demand (TOD) clutch. Power is not transferred to the rear wheels when the TOD clutch is fully released. When front wheel slip is detected, a controller commands at least partial engagement of the TOD clutch to transfer torque from the front wheels to the rear wheels. The TOD clutch may be part of the differential, as shown in FIG. 2, or may be a separate component between driveshaft 34 and axis transfer/final drive 38.

Figure 3:
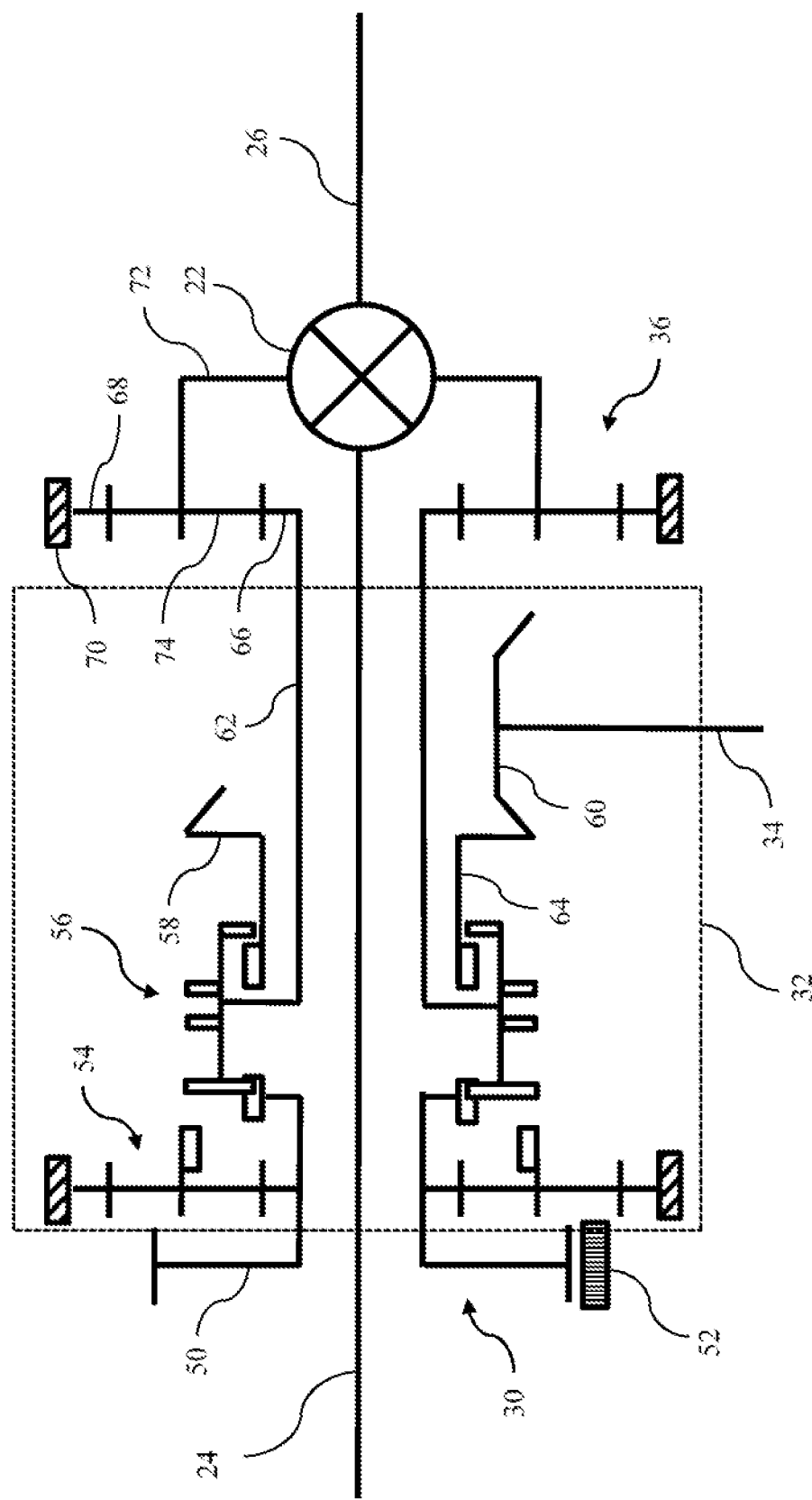
FIG. 3 is a diagram illustrating the structure of components on the front differential axis of the four wheel drive powertrain of FIG. 2.

FIG. 3 illustrates the components located on the front differential axis in more detail. The axis transfer gearing 30 includes a sprocket 50 on the differential axis. Chain 52 engages sprocket 50 and also engages a sprocket on the engine axis that is an output of gearbox 14. PTU/Range gearing 32 includes a first planetary gear set 54, actuator 56, and bevel gears 58 and 60. Actuator 56 transfers power to first hollow shaft 62 in two wheel drive high (2H) mode, four wheel drive high (4H) mode, and four wheel drive low (4L) mode. First hollow shaft 62 transfers the power to the front wheels via front final drive 36 and front differential 22. Actuator 56 transfers power to second hollow shaft 64 in 4H and 4L modes, but not in 2H mode. Power from second hollow shaft 64 is transferred to the rear wheels via bevel gears 58 and 60 and driveshaft 34. Bevel gears are meshing gears which transfer power between axes that are closer to perpendicular than to parallel. In some cases, the axes of bevel gears may intersect. Bevel gears in which the axes are offset (not intersecting) are called hypoid gears. The gear ratio of the bevel gearing is preferably between 0.8 and 1.2.

Front final drive gearing 36 includes a simple planetary gear set. Sun gear 66 is fixedly coupled to first hollow shaft 62. Ring gear 68 is fixedly coupled to housing 70. Carrier 72 is fixedly coupled to the input of differential 22. A plurality of planet gears 74 are supported for rotation with respect to carrier 72 and mesh with both sun gear 66 and ring gear 68. Front final drive gearing imposes a fixed speed reduction. In particular, the ratio of the speed of carrier 72 to the speed of first hollow shaft 62 is constrained to be $N_{66}/(N_{66}+N_{68})$, where $N_{66}$ is the number of gear teeth on sun gear 66 and $N_{68}$ is the number of gear teeth on ring gear 68.

Figure 4:
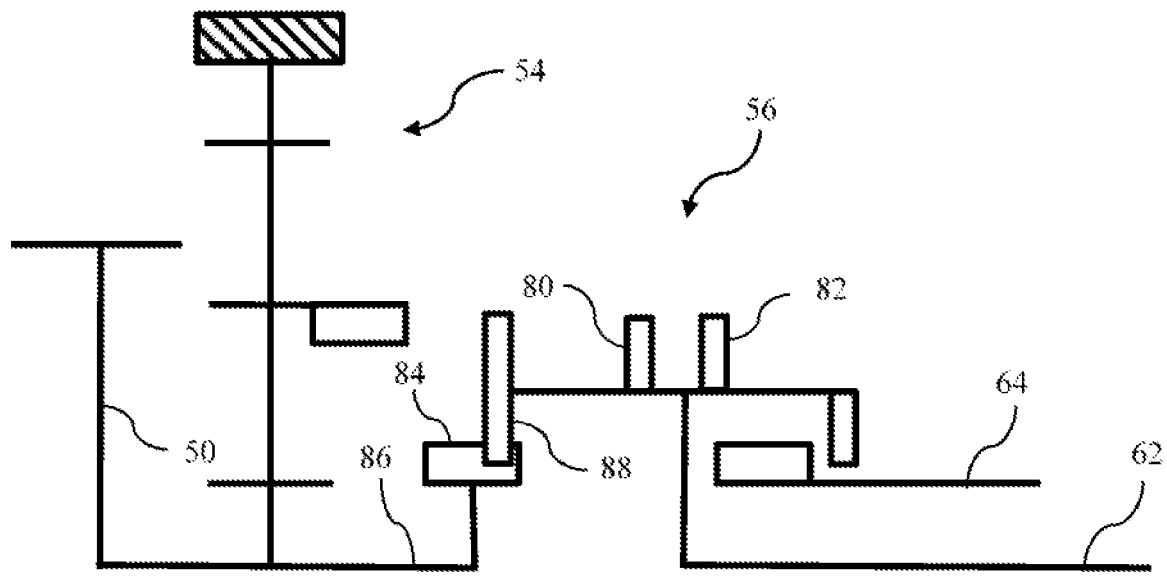
FIG. 4 is a diagram illustrating the range gearing and actuator in the position corresponding to a two wheel drive high range mode.
Figure 5:
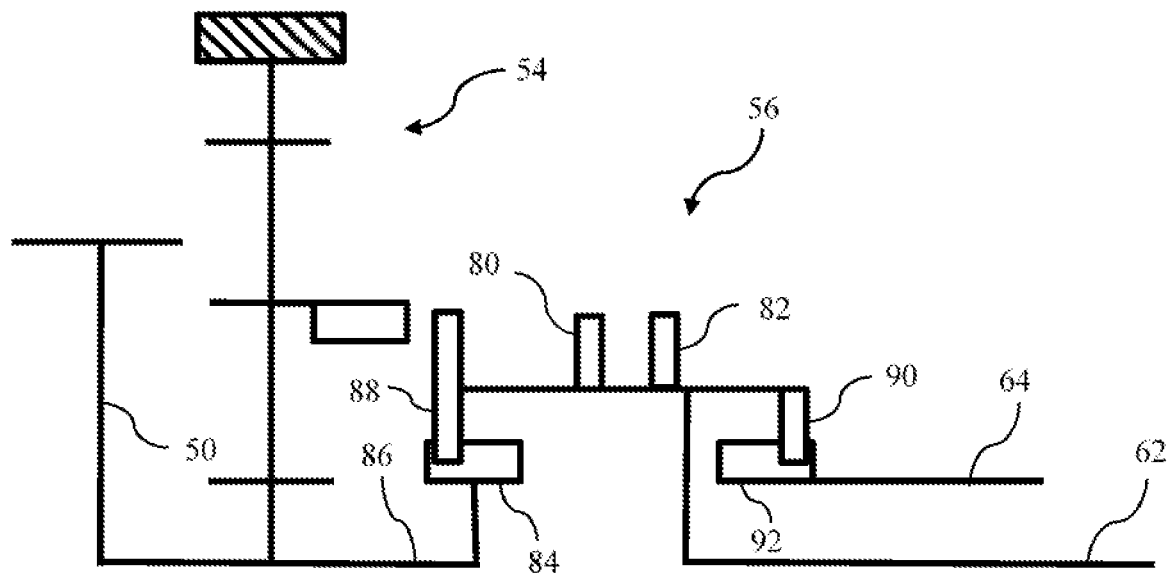
FIG. 5 is a diagram illustrating the range gearing and actuator in the position corresponding to a four wheel drive high range mode.
Figure 6:
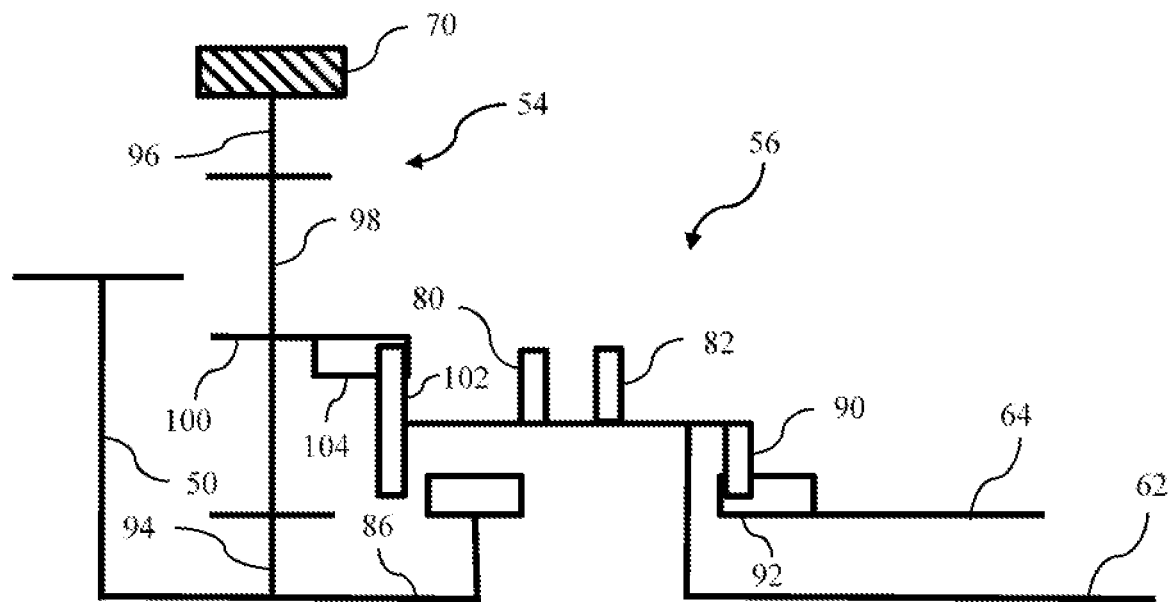
FIG. 6 is a diagram illustrating the range gearing and actuator in the position corresponding to a four wheel drive low range mode.

The structure and function of gear set 54 and actuator 56 is illustrated in more detail in FIGS. 4-6. FIG. 4 shows the actuator in the position corresponding to two wheel drive high (2H). Actuator 56 is fixedly coupled to first hollow shaft 62 and slides axially with respect to shaft 62. A controller adjusts the axial position of actuator 56 by moving a fork that engages plates 80 and 82. First exterior spline 84 is fixedly coupled to sprocket 50 by shaft 86. Actuator 56 includes a first interior spline 88 that engages first exterior spline 84 in the 2H position. Consequently, a direct drive power flow path is established between sprocket 50 and shaft 62. In the 2H position, shaft 64 is free to have a different speed or to be stationary, reducing parasitic drag. All power is transferred via shaft 62.

FIG. 5 shows the actuator in the position corresponding to four wheel drive high (4H). As in the 2H position, first interior spline 88 engages first exterior spline 84 to establish a direct drive power flow path between sprocket 50 and shaft 62. In the 4H position, second interior spline 90 also engages second exterior spline 92 to establish a direct drive power flow path between sprocket 50 and shaft 64. The power is split between shafts 62 and 64 depending upon the state of traction of front and rear tires and the state of the torque on demand clutch.

FIG. 6 shows the actuator in the position corresponding to four wheel drive low (4L). Sun gear 94 is fixedly coupled to sprocket 50. Ring gear 96 is fixedly coupled to housing 70. A plurality of planet gears 98 are supported for rotation with respect to carrier 100 and mesh with both sun gear 94 and ring gear 96. The ratio of the speed of carrier 100 to the speed of sprocket 50 is constrained to be $N_{94}/(N_{94}+N_{96})$, where $N_{94}$ is the number of gear teeth on sun gear 94 and $N_{96}$ is the number of gear teeth on ring gear 96. In the 4L position, a third external spline 102 of actuator 56 engages a third internal spline 104 fixed to carrier 100 establishing an underdrive power flow path from sprocket 50 to first hollow shaft 62. Second interior spline 90 also engages second exterior spline 92 to establish an underdrive power flow path between sprocket 50 and shaft 64. As in the 4H mode, the power is split between shafts 62 and 64 depending upon the state of traction of front and rear tires and the state of the torque on demand clutch.

In some embodiments, there may be a position between the 4H and 4L positions in which neither spline 88 nor spline 102 engages the corresponding spline. This establishes a neutral position in which the speed of sprocket 50 is not related to the speeds of shaft 62 and/or shaft 64. This mode is useful if the vehicle is to be towed with the wheels on the ground. This mode could alternatively be provided by an actuator position to the left of the 2H position in which none of the splines are engaged. In other embodiments, there may be a position between the 4H and 4L positions in which splines 88 and 102 both engage the corresponding spline. This establishes a park position in which the vehicle is restrained from moving.

Figure 7:
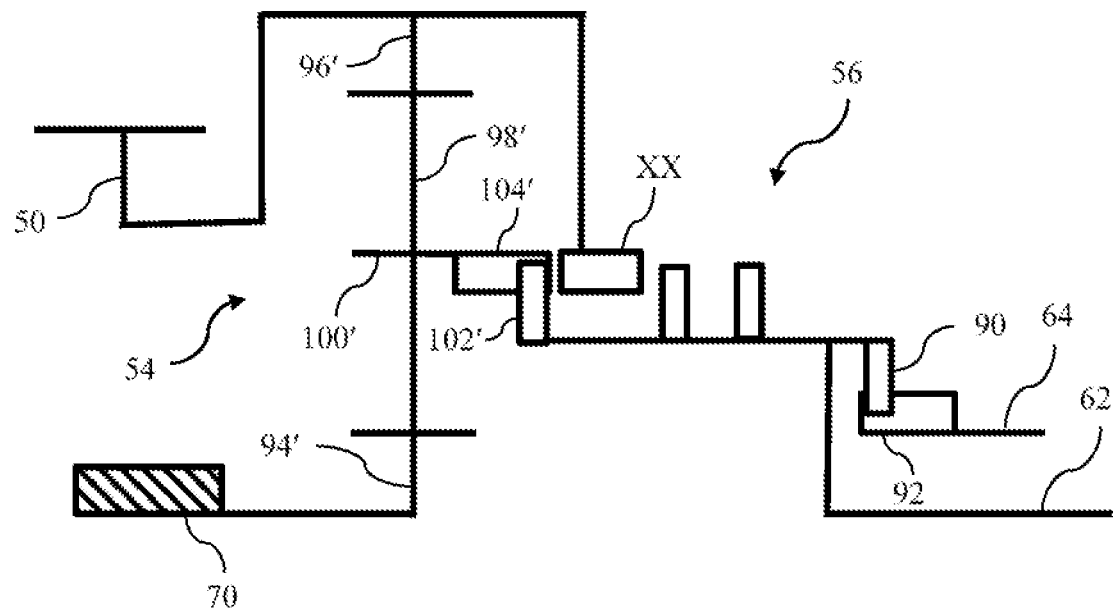
FIG. 7 is a diagram illustrating the an alternate embodiment of the range gearing and actuator in the position corresponding to a four wheel drive low range mode.

FIG. 7 shows an alternate actuator and gearing arrangement in the position corresponding to four wheel drive low (4L). Sun gear 94' is fixedly coupled to housing 70. Ring gear 96' is fixedly coupled to sprocket 50. A plurality of planet gears 98' are supported for rotation with respect to carrier 100' and mesh with both sun gear 94' and ring gear 96'. The ratio of the speed of carrier 100' to the speed of sprocket 50 is constrained to be $N_{96}/(N_{94}+N_{96})$, where $N_{94}$ is the number of gear teeth on sun gear 94' and $N_{96}$ is the number of gear teeth on ring gear 96'. In the 4L position, external spline 102' of actuator 56 engages a internal spline 104' fixed to carrier 100' establishing an underdrive power flow path from sprocket 50 to first hollow shaft 62. Interior spline 90 also engages exterior spline 92 to establish an underdrive power flow path between sprocket 50 and shaft 64. In this embodiment, spline 106, which is fixed to sprocket 50, engages spline 102' in the 4H and 2H modes.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An automotive power take-off unit comprising:
   range gearing configured to transmit power from a first gear element to first and second shafts alternately at a direct drive ratio and an underdrive ratio;
   final drive gearing configured to transmit the power from the first shaft to a differential; and
   bevel gearing configured to transfer power from the second shaft to a driveshaft, wherein the bevel gearing has a gear ratio between 0.8 and 1.2; and
   wherein the first gear element, first and second shafts, and differential are co-axial.

2. The automotive power take-off unit of claim 1 wherein the second shaft is a hollow shaft and the first shaft extends through the second shaft.

3. The automotive power take-off unit of claim 1 wherein:
   the first shaft is a hollow shaft;
   the differential is configured to transmit the power to first and second half shafts; and
   the first half shaft extends through the first shaft.

4. The automotive power take-off unit of claim 1 wherein the range gearing comprises:
   a sun gear fixedly coupled to the first gear element;
   a ring gear fixedly held against rotation;
   a carrier fixedly coupled to an input of the differential; and
   a plurality of planet gears supported for rotation with respect to the carrier and meshing with the sun gear and the ring gear; and
   a sleeve fixedly coupled to the first shaft and supported to slide between first and second positions wherein the sleeve engages the sun gear in the first position, the carrier in the second position, and the second shaft in both the first and second positions.

5. The automotive power take-off unit of claim 4 wherein the sleeve is further configured to slide to a third position in which the sleeve engages the sun gear but does not engage the second shaft.

6. A vehicle powertrain comprising:
   a first sprocket on a differential axis;
   range gearing configured to transmit power from the first sprocket to first and second shafts on the differential axis alternately at a direct drive ratio and an underdrive ratio;
   final drive gearing configured to transmit the power from the first shaft to a differential on the differential axis; and
   bevel gearing configured to transfer power from the second shaft to a driveshaft.

7. The vehicle powertrain of claim 6 wherein the bevel gearing has a gear ratio between 0.8 and 1.2.

8. The vehicle powertrain of claim 6 further comprising:
   a chain engaging the first sprocket and a second sprocket.

9. The vehicle powertrain of claim 8 wherein the chain imposes a speed ratio between the first sprocket and the second sprocket between 0.8 and 1.2.

10. The vehicle powertrain of claim 6 wherein the second shaft is a hollow shaft and the first shaft extends through the second shaft.

11. The vehicle powertrain of claim 6 wherein:
the first shaft is a hollow shaft;
the differential is configured to transmit the power to first and second half shafts; and
the first half shaft extends through the first shaft.

12. The vehicle powertrain of claim 6 wherein the final drive gearing comprises:
a sun gear fixedly coupled to the first shaft;
a ring gear fixedly held against rotation;
a carrier fixedly coupled to an input of the differential; and
a plurality of planet gears supported for rotation with respect to the carrier and meshing with the sun gear and the ring gear.

13. The vehicle powertrain of claim 6 wherein the range gearing comprises:
a sun gear fixedly coupled to the first sprocket;
a ring gear fixedly held against rotation;
a carrier fixedly coupled to an input of the differential; and
a plurality of planet gears supported for rotation with respect to the carrier and meshing with the sun gear and the ring gear; and
a sleeve fixedly coupled to the first shaft and supported to slide between first and second positions wherein the sleeve engages the sun gear in the first position, the carrier in the second position, and the second shaft in both the first and second positions.

14. The vehicle powertrain of claim 13 wherein the sleeve is further configured to slide to a third position in which the sleeve engages the sun gear but does not engage the second shaft.

15. A vehicle powertrain comprising:
a chain engaging a first sprocket and a second sprocket;
range gearing configured to transmit power from the first sprocket to first and second shafts alternately at a direct drive ratio and a first underdrive ratio;
final drive gearing configured to transmit the power from the first shaft to a differential at a second underdrive ratio; and
bevel gearing configured to transfer power from the second shaft to a driveshaft.

16. The vehicle powertrain of claim 15 wherein the bevel gearing has a gear ratio between 0.8 and 1.2.

17. The vehicle powertrain of claim 15 wherein the chain imposes a speed ratio between the first sprocket and the second sprocket between 0.8 and 1.2.

18. The vehicle powertrain of claim 15 wherein:
the first and second shafts are hollow;
the differential is configured to transmit the power to first and second half shafts; and
the first half shaft extends through the first shaft.

19. The vehicle powertrain of claim 18 wherein the range gearing comprises:
a sun gear fixedly coupled to the first sprocket;
a ring gear fixedly held against rotation;
a carrier fixedly coupled to an input of the differential; and
a plurality of planet gears supported for rotation with respect to the carrier and meshing with the sun gear and the ring gear; and
a sleeve fixedly coupled to the first shaft and supported to slide between first, second, and third positions wherein the sleeve engages the carrier in the first position, the sun gear in the second and third positions, and the second shaft in the first and second positions.

* * * * *